Sept. 14, 1954 W. G. KOLANDER 2,689,156
PORTABLE AUTOMOBILE TRAY
Filed Sept. 14, 1953
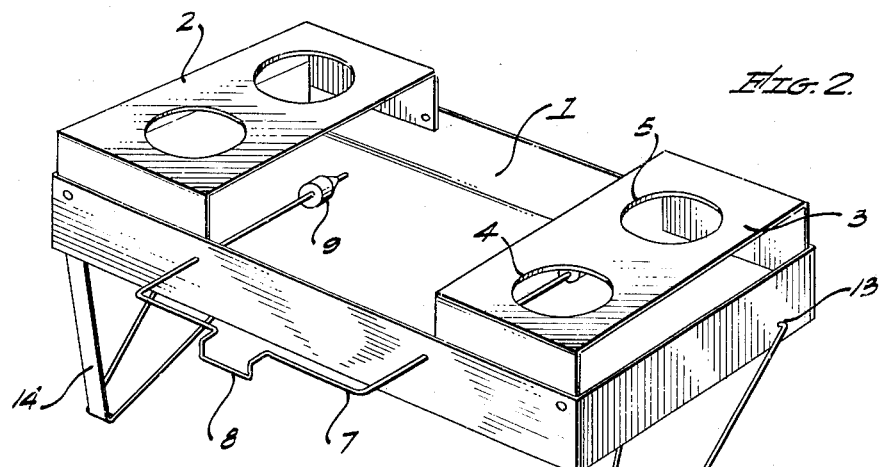
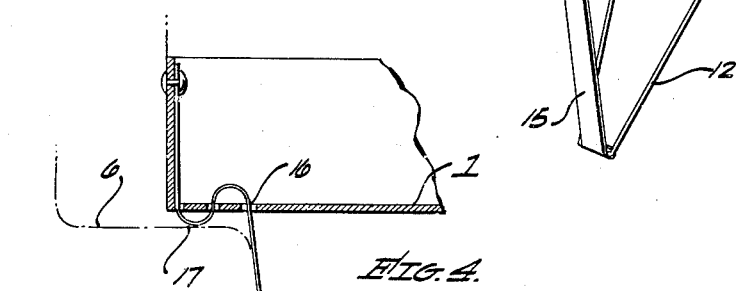
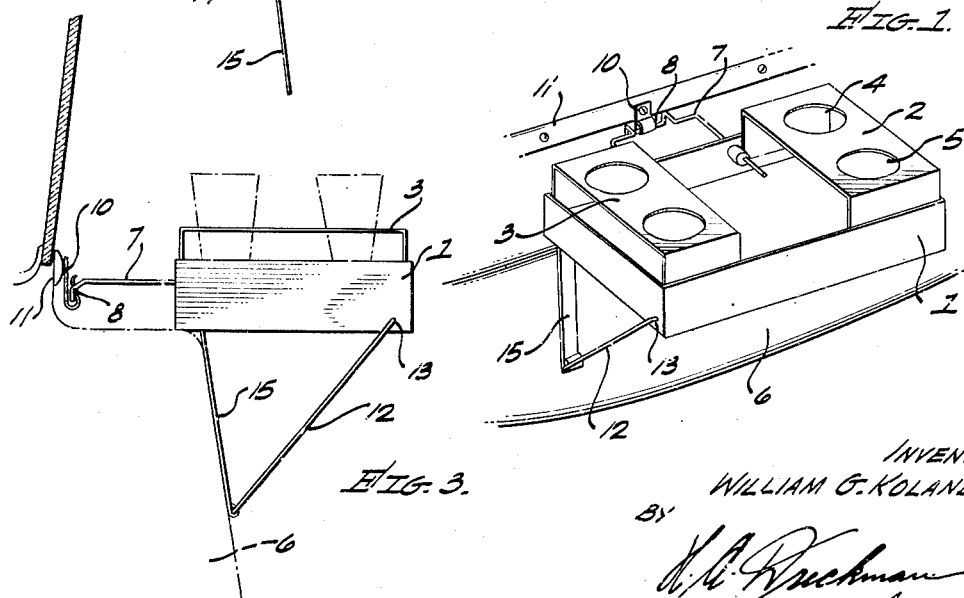
INVENTOR.
WILLIAM G. KOLANDER,
BY
ATTORNEY.

Patented Sept. 14, 1954

2,689,156

UNITED STATES PATENT OFFICE 2,689,156

PORTABLE AUTOMOBILE TRAY

William G. Kolander, Long Beach, Calif.

Application September 14, 1953, Serial No. 379,915

2 Claims. (Cl. 311—22)

This invention relates to a portable automobile tray, and particularly one which can be positioned on the dash of an automobile so that the occupants of the front seat can have a place to rest certain articles, such as cups, food products and the like.

An object of my invention is to provide a novel food tray which can be quickly and easily mounted on the instrument board, or the like of an automobile where it will be supported in a horizontal position available to the occupants of the vehicle.

Another object of my invention is to provide a novel means of supporting the automobile tray, either by means of the vent holes in the instrument board of an automobile, or on a hook or clip which is attached to the windshield moulding of the vehicle.

A feature of my invention is to provide a novel retractable bail which supports the tray when the bail is in its extended position.

Other objects, advantages and features of invention may appear from the accompanying drawing, the subjoined description and the appended claims.

In the drawing:

Figure 1 is a perspective view of my tray in position in an automobile.

Figure 2 is a perspective view of my portable tray.

Figure 3 is a side elevation of the same in position on a vehicle.

Figure 4 is a fragmentary transverse sectional view showing the means of mounting the flexible strap.

Referring more particularly to the drawing, the numeral 1 indicates a rectangular tray, preferably formed of metal, and of a sufficient depth to support certain articles, such as food, cups, etc. A pair of plates 2 and 3 are mounted in the tray 1, preferably one on each side of said tray. These plates 2 and 3 consist of substantially U-shaped strips of metal and each plate is formed with two or more holes 4—5 therein which receive a cup or a dish. To support the tray 1 adjacent the instrument board 6 of the automobile, I provide a wire bail 7 which is bent in a substantial U-shape and is formed with a hook 8, the hook being integral with the bail. A rubber or plastic stop button 9 is mounted on each of the arms of the bail 7 and these adjustable buttons can be slid along the arms of the bail, thus adjusting the distance which the bail protrudes from the tray 1. In other words, this adjustment will permit the tray 1 to be held in proper horizontal position irrespective of the depth of the instrument board 6 of the vehicle. The hook 8 engages a clip 10 which is secured to the windshield moulding 11 of the vehicle, and preferably to one of the screws which holds this moulding in position.

The outer portion of the tray 1 is supported from the vertical face of the instrument board 6 by means of wire fingers 12, which are preferably formed from a single length of wire hinged to the tray 1 as shown at 13, by bending the finger inwardly and fitting this inwardly bent portion into a hole in the end of the tray 1, substantially as shown. The finger 12 is normally pressed into a raised position against the bottom of the tray 1 by a suitable spring, all of which is usual and well known. To limit the downwardly swinging movement of the finger 12, I provide a pair of flexible straps 14—15, which straps are secured at one end to the finger 12 and the other end is looped through hole 16 in the bottom of the tray 1. One of the loops 17 of each of the straps protrudes from the bottom of the tray 1 and forms a buffer to protect the top surface of the instrument board 6 and prevents the vehicle from being marred.

It is to be noted that the bail 7 is positioned adjacent the top edge of the tray 1, and the purpose of this construction is to provide an effective lever arm which will hold the tray 1 substantially horizontal and without imparting too great a strain on the bail or on the sides of the tray. The positioning of the bail 7 close to the top edge of the tray 1 also enables the bail to compensate for the angularity of the top of the instrument board, thus the tray can be held in a horizontal position while the bail might extend upwardly or downwardly at an angle relative to the tray, and without having the bail engage the bottom of the tray due to its angular position.

Having described my invention, I claim:

1. A portable automobile tray, including a rear wall, a bail slidably mounted in the rear wall of the tray, stop means on the bail to limit the outward movement of the bail in the tray, fingers hingedly mounted on the tray and depending therefrom, a pair of straps, said tray having slots in the bottom thereof, each of the straps being threaded through the slots to form an external loop acting as a buffer, and the other end of the straps being attached to the fingers.

2. A portable automobile tray, including a rear wall, a wire bail slidably mounted in the rear wall of the tray, a stop button mounted on the bail and adjustable horizontally on the bail to limit the outward movement of the bail in the tray, fingers hingedly mounted on the tray and depending therefrom, a pair of straps, said tray having slots in the bottom thereof, each of the straps being threaded through the slots to form an external loop acting as a buffer, and the other end of the straps being attached to the fingers.

References Cited in the file of this patent

UNITED STATES PATENTS

| Number | Name | Date |
|---|---|---|
| 1,593,835 | McNeal et al. | July 27, 1926 |
| 1,662,163 | Norquist | Mar. 13, 1928 |
| 1,928,731 | Mattson | Oct. 3, 1933 |
| 2,125,476 | Westrope et al. | Aug. 2, 1938 |
| 2,296,028 | Gribble | Sept. 15, 1942 |
| 2,554,685 | Denis | May 29, 1951 |
| 2,584,557 | Cuthbertson | Feb. 5, 1952 |
| 2,628,140 | Bunce | Feb. 10, 1953 |